Patented July 14, 1942

UNITED STATES PATENT OFFICE 2,289,765

PROCESS OF POLYMERIZATION

Charles M. Fields, Arlington, N. J., assignor to E. I. du Pont de Nemours & Company, Wilmington, Del., a corporation of Delaware No Drawing. Application July 26, 1939, Serial No. 286,537

4 Claims. (Cl. 260—83)

This invention relates to a process of polymerization and, more particularly, to the partial polymerization of liquid ethenoid monomers.

For the manufacture of certain synthetic resins in cast shapes, and for other purposes, it has been found advantageous to use the starting material in a partially polymerized form, rather than in a substantially monomeric form. To this end, the monomeric liquid is heated, either with or without the addition of a catalyst of polymerization, to a sufficiently high temperature and for a sufficient length of time to effect a partial polymerization, whereby it is converted into a viscous syrup.

Because the reaction of polymerization is of exothermic nature, there is always the likelihood that it will proceed at an undesirably rapid rate and thus, before it can be checked by chilling, carry the polymerization further than is desired, converting the liquid to a syrup which is too viscous to be handled in subsequent operations. The danger of such lack of control increases with the size of the batch in that heat developed by the reaction in the center of a large mass of liquid may not be conducted away as fast as it develops. For this reason it is essential that any large batch which is undergoing polymerization, at a temperature which is likely to lead to loss of control, be stirred so as to prevent local overheating.

It is an object of the present invention to improve the conduct of such partial polymerization of a liquid ethenoid monomer to the form of a viscous syrup by hastening the progress of the reaction without sacrifice of the necessary control or of the uniformity of the syrup produced. Other objects will appear from the description given hereinafter.

In accordance with the present invention, these objects are accomplished by the process comprising heating an ethenoid monomer, without or with the addition of a catalyst of polymerization and, optionally, in admixture with plasticizers or other auxiliary ingredients, whereby to effect a partial polymerization thereof to the form of a viscous syrup and, during this period of heating, subjecting the said liquid to intermittent stirring. Preferably, the liquid undergoing polymerization is subjected alternately to through agitation of brief duration and quiescence of longer duration.

In view of the common experience that the progress of chemical reactions in a liquid phase is facilitated by continuous agitation, and in view of the common practice of providing continuous agitation for such reaction, it is surprising that the reaction of polymerization of liquid ethenoid monomers up to the form of a viscous syrup has now been found to be hindered and delayed by agitation. Advantage of this discovery is taken, in the process of the present invention, by supplying agitation only at such intervals and for such periods of time as will suffice to avoid the evil effects which would result from the absence of all agitation, namely the development of local overheating, particularly in the center of the batch, with the resulting danger of loss of control of the reaction.

The invention will be more apparent from the following description of carefully controlled experiments in which initially identical batches of monomeric methyl methacrylate were polymerized to the form of a syrup under different conditions of agitation. In each case the batch consisted of 30 pounds and the reaction was carried out in a 10 gallon container, made of stainless steel and having a jacket in which was circulated water at 82° C. No catalyst was used. Agitation was effected by means of a perforated plate mounted in a horizontal plane on a vertical shaft and reciprocated vertically.

Batch A was continuously agitated, with the agitator making 42 strokes per minute. At the end of 10 hours of this treatment, the methyl methacrylate had thickened only slightly. Its viscosity was measured in terms of the time required for the fall of an aluminum ball, of diameter 0.125 inch and of specific gravity 2.7, through a vertical distance of 10 inches in the liquid, contained in a tube of inside diameter 1.25 inches and maintained at 15° C. The time required was ⅕ second, which is hardly greater than the experimental error, but which, if correct, would indicate a viscosity of about six centipoises. This viscosity is not appreciably greater than the original monomer.

During the treatment of Batch A there developed a strong odor of formaldehyde, which is indicative of decomposition.

Batch B was agitated only intermittently, the agitator being alternately operated, at 42 strokes per minute, for 20 seconds and then held stationary for four minutes and 40 seconds. The agitator was thus in operation only one-fifteenth of the time. At the end of 2.75 hours the viscosity of the batch was measured in the equipment just described, and at the same temperature, and found to be 700 centipoises (calculated from falling time of 25 seconds). Throughout the reaction of polymerization to this point the odor of formaldehyde was barely detectable.

An analogous experiment indicates the applicability of the invention to the partial polymerization of styrene. Two batches were processed, starting with a common supply of styrene, containing no catalyst. The equipment was the same as that used in the experiment already described, with jacket temperature 82° C. and rate of agitation 42 strokes per minute.

Batch I of styrene was run like Batch A of methyl methacrylate, with continuous agitation, for 19 hours. Its viscosity was then about six centipoises (calculated from falling time of ⅓ second).

Batch II of styrene was run like Batch B of methyl methacrylate, with intermittent agitation, for seven hours, and reached a viscosity of 153 centipoises (calculated from falling time 5¾ seconds).

Batch I was now subjected to further heating, under intermittent agitation, and in six hours of this treatment reached a viscosity of 141 centipoises (calculated from falling time 5 seconds).

The invention is obviously applicable primarily to polymerization in batches of commercial size, for which it will ordinarily be desirable to provide power-driven agitators. In such equipment, the desired intermittent operation of the agitator can be effected automatically by a suitable clock-controlled switch. In the absence of such mechanical equipment, the procedure of the invention can be carried out by intermittently stirring the contents of a container by other means.

No agitation at all need be given during the first stages of the reaction, corresponding to what has been called the incubation period, during which period no appreciable increase of viscosity is observed. Once the viscosity has begun to increase, indicating the initiation of active polymerization, the agitation is to be provided merely at intervals closely enough spaced to avoid the risk of loss of control through local overheating made possible by lack of agitation. The intervals of time between successive brief periods of agitation will thus be shorter the higher the temperature at which the batch is being held, and more frequent agitation will be needed if catalyst is present than if it is not. The quality of the monomeric substance also has a bearing upon the facility with which polymerization proceeds.

A typical routine under the process of the invention may be seen in the polymerization of a batch of 300 pounds of methyl methacrylate, without catalyst, in a vessel of aluminum of 80 gallons capacity, with heat supplied by a water jacket maintained at 79° C. Agitation is supplied for periods of 20 seconds at intervals of five minutes. Polymerization proceeds smoothly and under control, with very little evolution of formaldehyde, and the syrup discharged from the vessel when the proper viscosity has been reached is uniform in viscosity. In about 3.5 hours a viscosity of 700 centipoises is reached.

In the early stages, agitation at longer intervals would suffice, but it is more convenient and perfectly satisfactory, particularly if automatic means of control are used, to start with agitation at the same intervals as will be desirable toward the end of the reaction, when the danger of loss of control is more imminent.

As will be apparent to those skilled in the art, the process of the present invention is broadly applicable to liquid ethenoid monomers. Among such monomers are acrylic and methacrylic acids and their numerous derivatives, as the anhydrides, amides, nitriles, esters, and the like, vinyl halides and esters, and styrene. Obviously, the present process is applicable to mixtures of monomers adapted to produce interpolymers as well as single monomers.

While the optimum timing of the periods of agitation and quiescence according to the present invention is bound to vary with different monomers, the temperature of polymerization, the volume of monomer, and the presence or absence of catalysts, the agitation is preferably both thorough and for a relatively brief period as compared to the intervening periods of quiescence. The longer the periods of quiescence may be made consistent with avoidance of any danger of local overheating and the shorter the periods of agitation consistent with thoroughly dissipating any localities in the batch tending to overheat, the more rapidly and efficiently the monomer may be polymerized to a syrup of the desired viscosity.

It will be understood that the exact viscosity of the syrup of partially polymerized material most desirable to be obtained will vary with particular uses to which the syrup is to be put and that the determination of the particular viscosity forms no part of the present invention.

An advantage of the process of the present invention is that it promotes to an extraordinary degree the rapid partial polymerization of ethenoid monomers to the condition of viscous syrup while preventing loss of control of the exothermic reaction of polymerization and minimizing decomposition of the ethenoid monomers.

As many apparently widely different embodiments of this invention may be made without departing from the spirit and scope thereof, it is to be understood that the invention is not limited to the specific embodiments thereof except as defined in the appended claims.

I claim:

1. A process of partially polymerizing, in relatively large batches, monomeric methyl methacrylate to a viscous syrup which comprises heating said methyl methacrylate in the absence of a liquid vehicle and, during said heating at least after the increase in viscosity of said liquid commences, subjecting said methyl methacrylate to periods of agitation of about 20 seconds duration at about 5 minute intervals.

2. A process of partially polymerizing, in relatively large batches, monomeric styrene to a viscous syrup which comprises heating said styrene in the absence of a liquid vehicle and, during said heating at least after the increase in viscosity of said liquid commences, subjecting said styrene to periods of agitation of about 20 seconds duration at about 5 minute intervals.

3. A process of partially polymerizing, in relatively large batches, a liquid polymerizable monomer from the group consisting of styrene and the saturated aliphatic alcohol esters of methacrylic acid, to a viscous syrup which comprises heating said monomer in the absence of a liquid vehicle and, during said heating at least after the increase in viscosity of said liquid commences, subjecting said monomer alternately to periods of agitation and quiescence, the duration of said periods of agitation being about $1/15$ of the duration of said periods of quiescence and the periods of quiescence being of insufficient duration to permit local overheating of the polymerizing body.

4. A process of partially polymerizing, in relatively large batches, a liquid polymerizable monomer from the group consisting of styrene and the saturated aliphatic alcohol esters of methacrylic acid, to a viscous syrup which comprises heating said monomer in the absence of a liquid vehicle and, during said heating at least after the increase in viscosity of said liquid commences, subjecting said monomer to periods of agitation of about twenty seconds duration at about five-minute intervals.

CHARLES M. FIELDS.